United States Patent Office 2,966,521
Patented Dec. 27, 1960

2,966,521

SULFURIZATION OF MERCAPTOLS

Irving D. Webb, Yorba Linda, Calif., assignor to Union Oil Company of California, Los Angeles, Calif., a corporation of California No Drawing. Filed May 19, 1958, Ser. No. 735,983

9 Claims. (Cl. 260—608)

This invention relates to a process for the sulfurization of mercaptols, and in particular concerns an improved method for combining elemental sulfur with certain mercaptol compounds to obtain organic products containing a high proportion of chemically bound sulfur.

Organic compounds or products containing relatively large amounts of chemically bound sulfur are widely employed as vulcanization accelerators and in the compounding of extreme pressure lubricants. More recently, certain of such products have been found to be effective fungicides, nematocides and bactericides. One type of such product or compound is that obtained by heating certain mercaptol compounds with elemental sulfur under such conditions of time and temperature that the sulfur combines chemically with the mercaptol and is not precipitated from the reaction product upon cooling the same to a low temperature. Such mode of preparation, however, is not always satisfactory from the standpoint of inducing large amounts of sulfur to combine with the mercaptol reactant and/or inducing even moderate amounts of sulfur to react at desirably low temperatures and in short reaction times.

I have now found that in reacting mercaptol compounds with elemental sulfur to form products containing increased amounts of chemically combined sulfur, the reaction may advantageously be promoted by carrying it out in the presence of a catalytic amount of a Friedel-Crafts catalyst. The use of such a catalyst in accordance with the invention permits large amounts of sulfur to be readily introduced into the mercaptol molecule at relatively low temperatures and short reaction times.

The mercaptol compounds to which the process of the invention is applicable have the general formula:

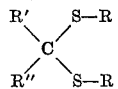

wherein R, R' and R" each represents a monovalent substituent selected from the class consisting of alkyl groups containing from 1 to about 22 carbon atoms and mono-nuclear aryl groups. Examples of such mercaptols include dimethyl acetone mercaptol, diphenyl acetone mercaptol, dicetyl methyl ethyl ketone mercaptol, di-tert.butylbenzophenone mercaptol, di-o-cresyl methyl isobutyl ketone mercaptol, di-(ethylphenyl)acetophenone mercaptol, di-octadecyl undecanone mercaptol, diphenyl propiophenone mercaptol, di-dodecyl dioctyl ketone mercaptol, di-(dimethylphenyl) methyl tetradecyl ketone mercaptol, etc. Mixtures of such mercaptols, for example, those obtained by reacting mercaptans with mixed ketones, may also be employed.

The catalysts which are employed in accordance with the process of the invention are those metal salts of the group commonly referred to as Friedel-Crafts catalysts, e.g. zinc chloride, ferric bromide, stannic chloride, aluminum chloride, mercuric chloride, boron trifluoride, etc. A zinc halide, particularly zinc chloride, is preferred.

The proportions in which the respective reactants are employed depend upon the identity of the same and upon the degree of sulfurization desired. Certain of the mercaptols, notably those derived from low molecular weight ketones such as acetone, readily combine with as many as 15 atoms of sulfur per molecule of the mercaptol, whereas others can be combined, even by the present process, with only about 5 sulfur atoms per molecule. Consequently the reactant proportions may be varied over relatively wide limits, e.g., from as little as 1 to as much as 15 or more atomic weights of sulfur per molecular weight of the mercaptol. Should the mercaptol be one incapable of reacting with all of the sulfur provided, the excess sulfur will deposit out of solution in the reaction product when the latter is cooled (e.g. to about 0° C.) and can readily be removed from the cooled product by filtration. Also, if desired, the sulfur may purposely be employed in excess in order to promote the formation of more highly sulfurized products. The catalyst is of course employed in an amount sufficient to effect a significant increase in the rate of reaction at a given temperature and/or in the number of sulfur atoms introduced into the mercaptol molecule. Ordinarily, however, between about 0.1 and about 5 parts by weight of the catalysts are provided per 100 parts of the combined weights of the two reactants.

The reaction itself is most readily carried out simply by charging the two reactants and the catalyst to a suitable reaction vessel and thereafter heating the mixture under such conditions of time and temperature that at least one atom of the elemental sulfur combines chemically with each molecule of the mercaptol. As will be apparent, the minimum conditions of time and temperature will be governed by the ease with which the mercaptol reactant combines with the sulfur and/or the number of sulfur atoms which is desired to be introduced into the mercaptol molecule. The maximum conditions are governed by the ease with which the mercaptol reactant and/or the sulfurized product are decomposed. Ordinarily, however, the reaction temperature will be between about 100° C. and about 200° C., and the reaction time will be between about 0.5 and about 12 hours. The reaction pressure is usually atmospheric or the autogenic pressure of the reactants, although higher pressures may be employed if desired. Also, if desired, the reaction may be effected in the presence of an inert liquid reaction medium, e.g., benzene, carbon tetrachloride, carbon disulfide, or the like, in order to promote intimate contact between the two reactants and the catalyst.

Upon completion of the reaction, the reaction product is filtered to separate off the catalyst and any unreacted sulfur. Conveniently, a small sample of the reaction product is cooled to about 0° C. to determine if any unreacted sulfur is contained therein. If such is the case the entire reaction product is cooled to about 0° C. prior to filtering; otherwise, it may advantageously be filtered hot. If the reaction has been carried out in the presence of an inert liquid reaction medium, the latter is removed by distillation or by stripping with an inert gas such as nitrogen. In most instances, the present process, like the prior art non-catalytic processes, produces a more or less complex mixture of individual sulfur-containing compounds. If desired, such mixture may be fractionated, usually under high vacuum, to separate individual or groups of individual compounds. However, for substantially all the known technical uses, such fractionation is unnecessary and in some cases may actually be undesirable; accordingly, the present process will not ordinarily include a step of separating the sulfurization product into individual compounds.

The following examples will illustrate several applications of the principle of the invention, but are not to be construed as limiting the same. All proportions are given in parts by weight.

*Example I*

A mixture of 136 parts of dimethyl acetone mercaptol, 160 parts of sulfur and 5 parts of anhydrous zinc chloride is heated for one hour at 150° C. in a closed vessel under autogenic pressure, and the reaction product is cooled, diluted with acetone and filtered to remove a very small amount of free sulfur. After distilling off the acetone, crude dimethyl acetone mercaptol pentasulfide is obtained in good yield. In the absence of the zinc chloride catalyst the introduction of 5 atoms of sulfur into the mercaptol molecule requires heating at 150° C. for 5 hours. The disulfide, trisulfide and tetrasulfide of dimethyl acetone mercaptol are prepared in the same manner by making appropriate changes in the proportions of the reactants.

*Example II*

A mixture of 62 parts of dimethyl 2-undecanone mercaptol, 16 parts of elemental sulfur and 0.8 part of anhydrous zinc chloride is heated at 110°–150° C. for 40 minutes. No sulfur precipitates upon cooling the reaction product to ice-bath temperature. The crude reaction product is filtered and stripped with nitrogen for one hour at room temperature under 1.0 mm. pressure to obtain dimethyl 2-undecanone mercaptol disulfide in substantially pure form. The corresponding trisulfide is prepared by increasing the amount of sulfur to 24 parts and effecting the reaction at 115°–150° C. for 40 minutes. Substantially identical results are obtained when ferric bromide is substituted for the zinc chloride catalyst.

*Example III*

Dimethyl methyl isobutyl ketone mercaptol disulfide is prepared by heating 89 parts of the mercaptol with 32 parts of sulfur in the presence of 1.2 parts of aluminum chloride at 105°–150° C. for one hour, followed by cooling, filtering and gas stripping as described above. The trisulfide is obtained by increasing the amount of sulfur to 48 parts.

*Example IV*

Diphenyl octanone mercaptol disulfide is prepared by reacting 1 molecular weight of diphenyl octanone mercaptol with 2 atomic weights of sulfur and 0.02 molecular weight of boron trifluoride at 140° C. for 40 minutes, and then cooling and gas stripping the reaction product as previously described. The tetrasulfide is prepared by increasing the amount of sulfur to 4 atomic weights.

*Example V*

Di-isopropyl benzophenone mercaptol disulfide is prepared by reacting 1 molecular weight of the mercaptol with 2 atomic weights of sulfur and 0.02 molecular weight of anhydrous zinc chloride at about 170° C. for 2 hours, and then cooling, filtering and gas stripping the reaction product as previously described.

*Example VI*

Dimethyl propiophenone mercaptol decasulfide is prepared by heating a mixture of 1 molecular weight of the mercaptol, 10.5 atomic weights of sulfur, and 0.5 molecular weight of anhydrous zinc chloride at 180° C. for about 4 hours, and thereafter cooling the reaction product and filtering off the unreacted excess sulfur.

*Example VII*

A mixture consisting of 1 molecular weight of dioctyl acetophenone mercaptol, 4 atomic weights of sulfur and 0.05 molecular weight of zinc chloride is dispersed in an equal volume of carbon tetrachloride. The liquid mixture is heated at about 180°–190° C. for about 4 hours under autogenic pressure. The crude reaction product is then fractionally distilled to remove the reaction medium and low boiling by-products as an overhead fraction, and the bottoms fraction is re-distilled to obtain an overhead fraction consisting essentially of the mercaptol tetrasulfide.

Other modes of applying the principle of my invention may be employed instead of those explained, change being made as regards the methods or materials employed provided the step or steps stated by any of the following claims, or the equivalent of such stated step or steps be employed.

I, therefore, particularly point out and distinctly claim as my invention:

1. In a process wherein a mercaptol compound having the general formula

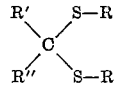

wherein R, R' and R'' each represents a monovalent substituent selected from the class consisting of alkyl radicals containing from 1 to 22 carbon atoms and mononuclear aryl radicals, is heated with a molal excess of elemental sulfur under conditions of time and temperature such that greater than one atom of said sulfur combines per atom of combined sulfur in said mercaptol compound in such manner that it does not precipitate upon cooling the reaction product to about 0° C., the improvement which consists in effecting said heating in the presence of a catalytic amount of a Friedel-Crafts catalyst.

2. A process according to claim 1 wherein the said catalyst is a zinc halide.

3. A process according to claim 1 wherein R represents the methyl radical.

4. A process according to claim 3 wherein the said catalyst is anhydrous zinc chloride.

5. The process which comprises heating a mercaptol having the general formula

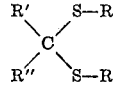

wherein R, R' and R'' each represents a monovalent substituent selected from the class consisting of alkyl radicals containing from 1 to 22 carbon atoms and mononuclear aryl radicals with a molal excess of elemental sulfur at a temperature between about 100° C. and about 200° C. for such period of time that greater than one atom of said sulfur per atom of combined sulfur in said mercaptol combines chemically with said mercaptol compound, said heating being carried out in the presence of a catalytic amount of a Friedel-Crafts catalyst.

6. The process of claim 5 wherein the said catalyst is a zinc halide.

7. The process of claim 5 wherein R represents the methyl group.

8. The process of claim 5 wherein greater than 1 but less than about 15 atomic weights of sulfur are provided per molecular weight of said mercaptol compound.

9. The process of claim 7 wherein the said catalyst is anhydrous zinc chloride.

References Cited in the file of this patent

Holmberg: Liebig's Annalen 359, 81–99 (1908).
Boeseken: Chemical Abstracts 5, 3399 (1911).
C. A. Thomas: Anhydrous Aluminum Chloride in Organic Chemistry A.C.S., Monograph Series No. 87, page 164 (1941), Reinhold Publ. Co., New York, N.Y.